UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

NEW VAT DYE.

961,387.

Specification of Letters Patent. Patented June 14, 1910.

No Drawing. Application filed February 19, 1910. Serial No. 544,867.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in New Vat Dyes, of which the following is a specification.

My invention relates to the manufacture and production of new vat dyes of the anthracene series. The process for their production consists in treating anthraquinone mercaptans or the disulfids (obtained from mercaptans by oxidation) with alkali polysulfids to such temperatures that dyes insoluble in water are obtained. Instead of mercaptans themselves products, which by the action of alkali polysulfids yield mercaptans can be used, such as rhodanids, xanthogenates, halogen substituted anthraquinones, anthraquinone sulfonic acids.

The new dyes are after being dried and pulverized from brown to black powders which are insoluble in water, alkalies, alkaline sulfids and organic solvents. They yield on treatment with hydrosulfite and caustic alkali vats suitable for dyeing cotton from olive to gray to brownish-black fast shades.

In order to illustrate the new process more fully the following example is given, the parts being by weight:—1 part of 1-aminoanthraquinone-5-sulfonic acid is heated in an autoclave to 170° C. for 10 hours with 2 parts of sulfur, 10 parts of crystallized $Na_2S$ and 8 parts of water. After cooling the product of the reaction is filtered off and washed with hot water. The new dye is a black powder soluble in concentrated sulfuric acid with a black-brown color. The vat with hydrosulfite and NaOH has a greenish-black color. It dyes cotton fast greenish-black-brown shades. Quite similar properties show the dyes obtained from 1-aminoanthraquinone-8-sulfonic acid or from a mixture of these two acids. The dyes obtained from anthraquinone-1- or 2-mercaptan dye cotton grayish-brown. The dye obtained from anthraquinone-1.5-disulfonic acid and polysulfids dyes a reddish-black-brown.

Other mercaptans, etc., may be used *e. g.* 2-methylanthraquinone-1-mercaptan, 4- or 5-aminoanthraquinone-1-mercaptan, etc.

I claim:—

1. The herein described new dyes obtainable from the hereinbefore defined anthraquinone derivatives, especially anthraquinone mercaptans and anthraquinone derivatives yielding mercaptans with alkali polysulfids, which dyes are after being dried and pulverized from brown to black powders which are insoluble in water, alkalies, alkaline sulfids and organic solvents, giving vats with hydrosulfite and caustic soda lye, which vats dye cotton from olive to gray to brownish-black fast shades, substantially as described.

2. The herein described new dye obtainable from 1-aminoanthraquinone-5-sulfonic acid and alkali polysulfid, which is after being dried and pulverized a black powder soluble in concentrated sulfuric acid containing 20 per cent. of $SO_3$ with a black-brown color, forming a greenish-black vat with hydrosulfite and NaOH which vat dyes cotton fast greenish-black-brown shades, substantially as described.

In testimony whereof I have hereunto set my hand in the presence of two subscribing witnesses.

PAUL THOMASCHEWSKI. [L. S.]

Witnesses:
OTTO KÖNIG,
CHAS. J. WRIGHT.